United States Patent [19]

Hasuda et al.

[11] Patent Number: 4,666,760
[45] Date of Patent: May 19, 1987

[54] FLEXIBLE OPTICAL SOLAR REFLECTOR

[75] Inventors: Yoshinori Hasuda, Tokyo; Shigekuni Sasaki, Iruma; Toshihiro Ichino, Yokohama, all of Japan

[73] Assignee: Nippon Telegraph & Telephone Corporation, Tokyo, Japan

[21] Appl. No.: 772,650

[22] Filed: Sep. 4, 1985

[30] Foreign Application Priority Data

Sep. 7, 1984 [JP] Japan .................. 59-187769
Nov. 9, 1984 [JP] Japan .................. 59-236100
May 24, 1985 [JP] Japan .................. 60-111476

[51] Int. Cl.⁴ .................. B32B 7/02; B32B 15/08
[52] U.S. Cl. .................. 428/215; 428/422; 428/457; 428/458; 428/460; 428/461; 428/473.5
[58] Field of Search .......... 428/458, 460, 49, 473.5, 428/457, 461, 422, 215; 136/292; 244/173

[56] References Cited

U.S. PATENT DOCUMENTS 3,917,643 11/1975 Takekoshi et al. .................. 428/458
4,024,101 5/1977 Takekoshi et al. .................. 428/458
4,232,070 11/1980 Inouye et al. .................. 428/49

FOREIGN PATENT DOCUMENTS 0136249 8/1984 Japan .................. 428/460

OTHER PUBLICATIONS

T. E. Attwood et al., "Synthesis and Properties of Polyarylether-ketones", Polymer, Aug. 1981, vol. 22, pp. 1096-1103.
Y. Hasuda et al., "Application of Thermoresistant Polymers to a New Flexable Second Surface Mirror", AIAA 20th Thermophysics Conference, Jun. 1985, pp. 1-4.

Primary Examiner—Thomas J. Herbert
Attorney, Agent, or Firm—Frishauf, Holtz, Goodman & Woodward

[57] ABSTRACT

A flexible optical solar reflector (FOSR) which may be also used as an outermost layer of a multilayer thermal insulator comprising:
a heat radiation layer of a resin selected from the group consisting of poly[(4'-phenoxy-4-carbonyl)diphenyl ether] represented by the following general formula of:

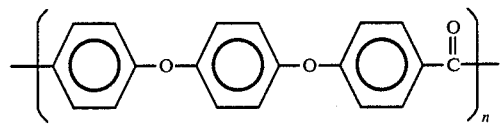

and poly (ether imide) represented by the following general formula of:

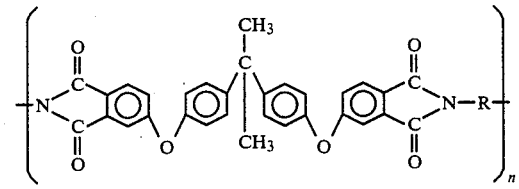

wherein R is a meta-substituted phenyl group, a para-substituted phenyl group or a 4,4'-substituted phenyl ether group; and
a solar light reflecting layer disposed on said heat radiation layer and made of a thin coating of a metal selected from the group consisting of silver and aluminium, A $CeO_2$ covering layer may be disposed over the heat radiation layer. The FOSR is excellent in resistance to ultraviolet rays, particularly in resistance to electron beam, and superior in optical and mechanical properties.

17 Claims, 16 Drawing Figures

FLEXIBLE OPTICAL SOLAR REFLECTOR

BACKGROUND OF THE INVENTION

1. Field of Art

The present invention relates to a flexible optical solar reflector or flexible second surface mirror which is assembled in an artificial satellite or other equipment containing therein precise instruments for controlling the intake and output of heat in or from the satellite to maintain the temperature in the satellite within a pre-set range. It relates also to a multilayer insulator having an excellent thermal insulation function.

It is requisite to maintain the temperature in an artificial satellite within a certain operable temperature range in order that the instruments contained therein are operated normally. For this purpose, a material serving as an optical solar reflector (hereinafter referred to as OSR) is applied on the exterior surface of the satellite. The known materials used for such a purpose include so-called OSR which suppress the intake of heat due to solar light and radiate heat, and multilayered insulator materials only for suppressing the intake of heat.

An OSR is comprised of a heat radiation layer made of a resin or glass; and a metal layer, normally made of silver, for reflecting solar light, and attached to the radiation surface of the satellite. The performance characteristics of the OSR may be defined by the solar absorptance ($\alpha s$) indicating the degree of absorbing the solar light and by the thermal emittance ($\epsilon$) indicating the degree of emitting the heat in the satellite. In order to maintain the temperature in the satellite within a pre-set range, $\alpha s$ should be low and $\epsilon$ should be high. It is also requisite that the changes in $\alpha s$ and $\epsilon$ be small.

2. Related Art Statement

Known OSR include flexible optical solar reflectors (hereinafter referred to as FOSR) each being composed of a thermoresistant polymer as a heat radiation layer, and rigid optical solar reflector (rigid OSR) including glass as the heat radiation layer.

The rigid OSR are excellent in durability in geosynchronous orbit or aerospace environment so that the performance characteristics thereof are not deteriorated even after they have been used for a long time period. However, since they are in the shape of flat plate and are difficult to form with curved surfaces, they can only be used at limited locations on the satellite. Further disadvantages of the rigid OSR are that extreme care must be taken in handling thereof and that difficulties are encountered in assemblying them in the satellite, since they are made of thin glass plates.

In contrast thereto, the FOSR cause no serious problem in the assemblying operation and may be used at any locations without limitation. However, the conventional FOSR could not be used for a long period due to deterioration of the component resins under the influences of radioactive rays. The thermoresist resins used in the conventional FOSR were a transparent copolymer of tetrafluoroethylene and hexafluoropropylene, and transparent aromatic polyimides.

The known multilayer thermal insulator is composed of laminated polymer films each being coated with aluminium or silver by vacuum deposition. The $\alpha s$ and $\epsilon$ of the material used for forming the outermost layer of the multilayer thermal insulator affect the thermal insulation function of the specific multilayer thermal insulator. The materials used for forming the outermost layer of the known multilayer thermal insulator are an aromatic polyimide film (such as the polyimide film sold under the Trade Name of KAPTON) which is excellent in resistance to radioactive rays, and FEP Teflon which is excellent in $\alpha s$.

An artificial satellite is held in a geosynchronous orbit or aerospace environment and thus subjected to high vacuum, extremely low temperature, irradiation of solar light and irradiation of radioactive rays including electron irradiation. Accordingly, materials for the OSR suffer various stresses. The FEP Teflon presently used as a material for FOSR is highly resistive to ultraviolet rays and heat, but it is known that the FEP Teflon apts to be deteriorated by electron irradiation. It has been pointed out that the main polymer chain of the FEP Teflon is cleaved by a chain reaction caused by electron irradiation, whereby the mechnical strength thereof approximates zero with disadvantageous increase in $\alpha s$. A silverized FEP Teflon, which is predominantly used as a material for the FOSR is seriously deteriorated in its properties due to irradiation of radioactive rays, particularly electron irradiation, when it is held in a geosynchronous orbit or aerospace environment. For this reason, the FEP Teflon is not suited for use in an artificial satellite which is designed to have a long life. Under such circumstances, it is demanded to develop a novel material for the FOSR having a resistance to irradiation of radioactive rays.

Likewise, there is a demand for a material having a smaller $\alpha s$ value and an improved resistance to irradiation of radioactive rays so as to be adapted for use as a material for the outermost layer of the conventional multilayer thermal insulator.

On the other hand, an FOSR comprised of an aromatic polyimide film, which is excellent in resistance to radioactive rays, applied with a vacuum deposited aluminium coating and having a film thickness of 125 microns has only an unsatisfactory $\alpha s$ value of 0.5. A polyimide including therein an aromatic imide ring for improving the resistance to radioactive rays loses transparency, and thus such a material is hardly adapted for use as a convenient FOSR material. U.S. Pat. No. 3,917,643 discloses that a poly(phthalimide) having ether bonds and prepared through a reaction between a phthalic anhydride having an aromatic bis-ether bond and an organic diamine (this kind of poly(phthalimide)s being hereinafter referred to simply as poly(ether imide) may be used as an enamel for coating a wire. On the other hand, U.S. Pat. No. 4,024,101 discloses that a poly(ether imide) having aromatic bis-ether bonds and prepared through a reaction between bis(nitrophthalimide) and a diphenoxide of an alkali metal may be used as an injection molding material. It is known that this kind of poly(ether imide)s has a molecular structure containing a bond group for cleaving the conjugated system so that such a material has relatively high transparency. However, the organic diamine residue contained as a structural unit in the poly(ether imide) is apt to be oxidized. As a result of oxidation of the diamine or diamine residue, the transparency of the final product is lowered. In addition, if unreacted bis(nitrophthalimide) is present in the reaction product, the transparency of the final product is adversely affected. T. E. Attwood et al. have reported on poly(arylether ketone), reference should be made to Polymer, Vol. 22, August 1981, Pages 1096 to 1103.) For example, poly[(4-phenoxy-4-carbonyl)diphenyl ether] can be synthesized by polycondensation of bis-4-fluorophenyl ketone and a potassium salt of hydroquinone.

SUMMARY AND OBJECTS OF THE INVENTION

We have reported in the 20th Conference of American Institute of Aeronautic and Astronautics (AIAA), held at Williamsburg, Va., on June 19 to 21, 1985, in our report entitled with "Application of Thermoresistant Polymers to a New Flexible Second Surface Mirror" on flexible second surface mirrors or optical solar reflectors made of a poly(ether imide) and poly[(4-phenoxy-4'-carbonyl)diphenyl ether] having excellent resistances to electron irradiation and thermooptical and mechanical properties, and inter alia we have reported that the prevention of deterioration by ultraviolet rays can be attained by the provision of a cerium dioxide coating.

The principal object of this invention is to provide an FOSR and a multilayer thermal insulator superior in heat control function and adaptability to aerospace environment for maintaining the temperature of the instruments contained in an artificial satellite in geosynchronous orbit or aerospace environment within an operable temperature range for a long period of time.

The optical solar reflector provided in accordance with the present invention comprises:

a heat radiation layer of a resin selected from the group consisting of poly[(4'-phenoxy-4-carbonyl)diphenyl ether] represented by the following general formula of:

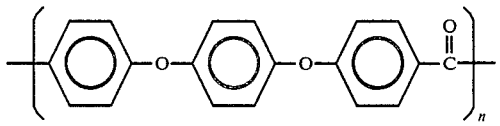

wherein n is between 2 to 10,000, preferably between 20 to 500.

and polyether imides represented by the following general formula of:

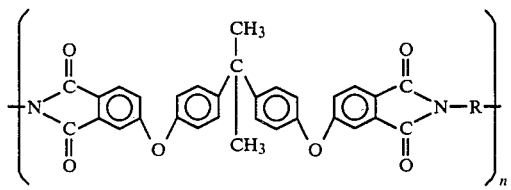

wherein R is a meta-substituted phenyl group, a para-substituted phenyl group or a 4,4'-substituted phenyl ether group, n is between 2 to 10,000, preferably between 20 to 500; and a solar light reflecting layer disposed on said heat radiation layer and made of a thin coating of a metal selected from the group consisting of silver, aluminium and, silver aluminium alloy.

According to a further aspect of this invention, there is provided a flexible optical solar reflector as described in the preceding paragraph, further comprising a protection layer for preventing deterioration by ultraviolet rays, said protection layer being made of cerium dioxide and disposed on the side of said heat radiation layer reverse to the side on which said solar light reflecting layer is disposed.

The multilayer thermal insulator, according to the present invention, comprises at least one optical solar reflector including a heat radiation layer of a resin and a solar light reflecting layer disposed on said heat radiation layer, and at least one thermal insulator structure, said optical solar reflector and said thermal insulator structure being laminated alternatively one on the another, and wherein the outermost optical solar reflector includes a heat radiation layer of a resin selected from the group consisting of poly[(4'-phenoxy-4-carbonyl)diphenyl ether] and poly(ether imide); and solar light reflecting layer disposed on the side of said heat radiation layer and made of a thin coating of a metal selected from the group consisting of silver and aluminium and silver aluminium alloy, The multilayer thermal insulator, according to the present invention, is improved over the conventionally known FOSR made of an aromatic polyimide in transmittance of light, excellent in resistances to radioactive rays and to ultraviolet rays, and is flexible and can be applied over a curved surface and has a solar light absorptance ($\alpha s$) of not more than 0.16 and a thermal emittance ($\epsilon$) of not less than 0.77.

In a preferred embodiment of the invention, the FOSR may be provided with a transparent conductive layer in order to prevent static electricity charge and to prevent dielectric breakdown.

BRIEF DESCRIPTION OF THE DRAWINGS

A more detailed understanding of the invention may be had from the following description of presently preferred embodiments when read with reference to the accompanying drawings wherein.

Figure 13:
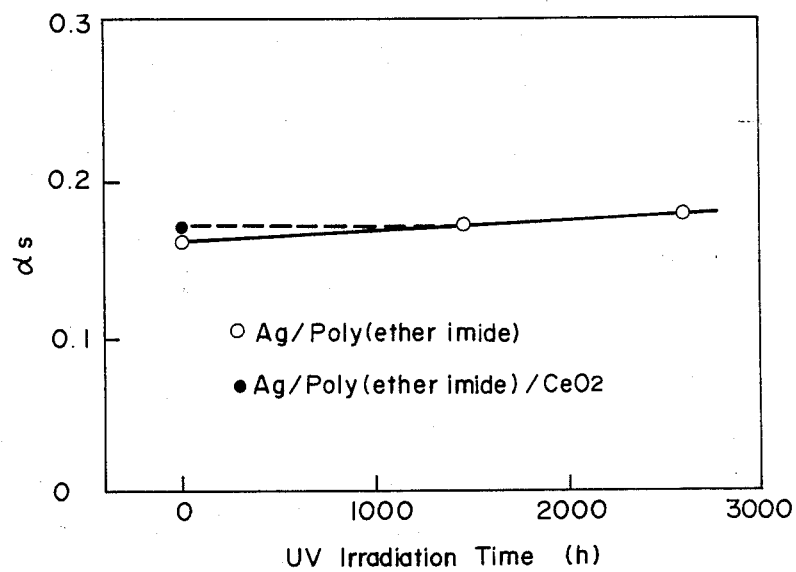
Figure 14:
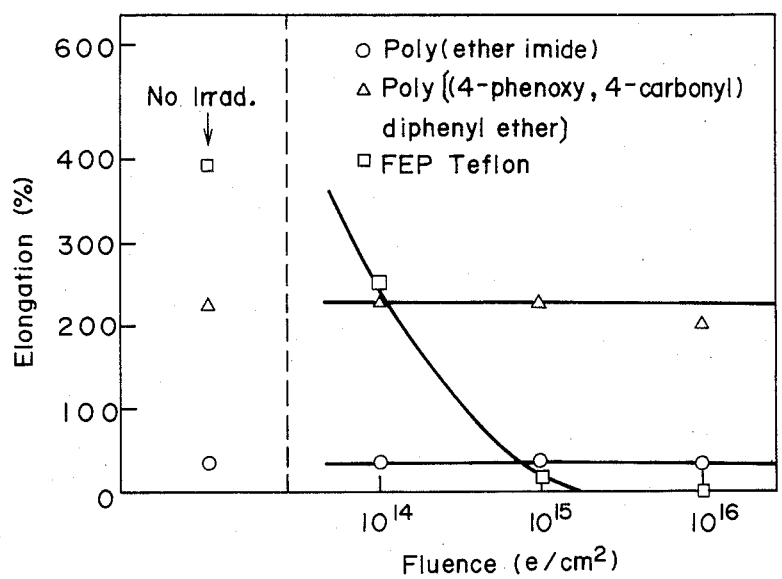
Figure 15:
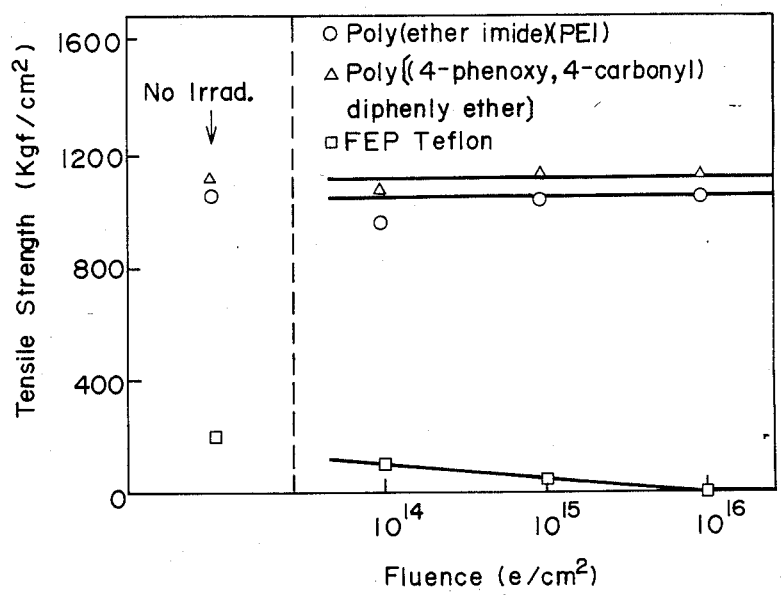
Figure 16:
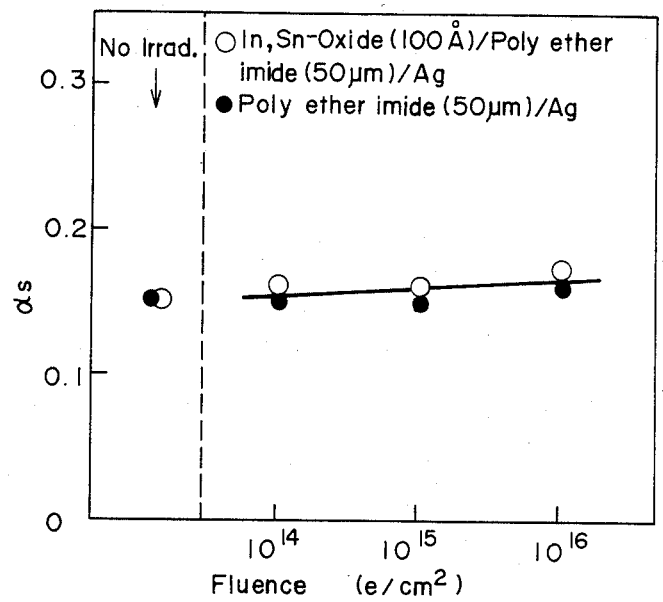

FIG. 13 is a graph showing the $\alpha s$ changes in silver/poly(ether imide) and silver/poly(ether imide)/$CeO_2$ system flexible optical solar reflectors by electron irradiation;

FIG. 14 is a graph showing the effects of electron irradiation on elongation of poly(ether imide), poly[(4-phenoxy-4'-carbonyl)diphenyl ether] and FEP-Teflon systems;

FIG. 15 is a graph showing the effects of electron irradiation on tensile strength of the same materials; and FIG. 16 is a graph showing the $\alpha s$ change of the transparent indium-tin oxide/poly(ether imide) silver system FOSR by electron irradiation.

DETAILED DESCRIPTION OF THE INVENTION

Embodiments of the present invention will now be described in detail with reference to the drawings.

Figure 1:
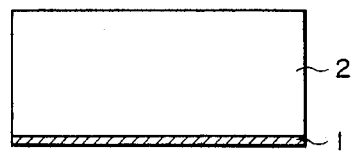
FIG. 1 is a sectional view of an optical solar reflector composed of a heat radiation layer and a solar light reflecting layer.
Figure 4:
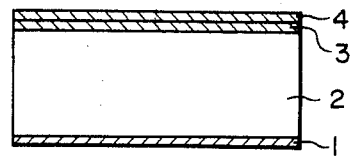
FIG. 4 is a sectional view of another optical solar reflector including a transparent conductive layer applied on said protection layer for preventing deterioration by ultraviolet rays of the optical solar reflector shown in FIG. 2.
Figure 2:
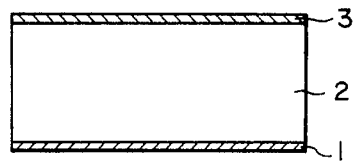
FIG. 2 is a sectional view of another optical solar reflector including a protection layer for preventing deterioration by ultraviolet rays applied on said heat radiation layer of the optical solar reflector of FIG. 1.
Figure 3:
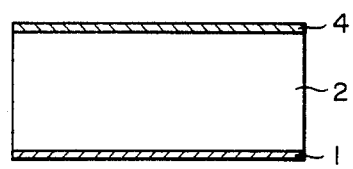
FIG. 3 is a sectional view of another optical solar reflector including a transparent conductive layer applied on said heat radiation layer of the optical solar reflector shown in FIG. 1.
Figure 5:
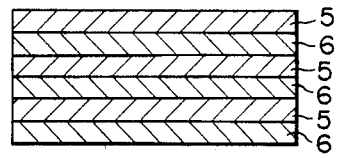
FIG. 5 is a sectional view of a multilayer thermal insulator.

Initially referring to FIG. 1 showing a sectional view of an optical solar reflector according to the invention, a solar light reflecting layer 1 is covered by a heat radiation layer 2, the thicknesses of these layers being illustrated in somewhat exaggerated scale. FIG. 2 shows another embodiment further including a protection layer 3 for preventing deterioration by ultraviolet rays, the protection layer 3 being laid over the heat radiation layer 2. FIG. 3 shows a further embodiment having an electrically conductive layer 4 covering the heat radiation layer 2. FIG. 5 shows a multilayer thermal insulator composed of a plurality of optical solar reflectors 5 and thermal insulators 6 laminated alternatively, wherein the outermost optical solar reflector 5 may have preferably the structure composed of a heat radiation layer 2 and a solar light reflecting layer 1, as shown in FIG. 1. The outermost optical solar reflector 5 of the multilayer thermal insulator shown in FIG. 5 may be composed of any of the optical solar reflectors shown in FIGS. 2, 3 and 4.

The flexible optical solar reflectors of the invention were tested to learn the transparency, solar absorptance $\alpha s$, thermal emittance $\epsilon$, resistance to radioactive rays and resistance to ultraviolet rays.

The solar light reflecting layer 1 may be made of any known material having a high reflection coefficient to solar light. In general, a thin metal layer having a high reflection coefficient, such as silver, aluminium, and silver-aluminium alloy is used for the solar light reflecting layer 1. The thickness of the solar light reflecting layer 1 may preferably range within 500 to 9000 Å.

The heat radiation layer 2 is made of a film which is transparent and excellent in resistance to radioactive rays. Examples of such material include a film of a resin selected from poly(ether imide) represented by the following general formula of:

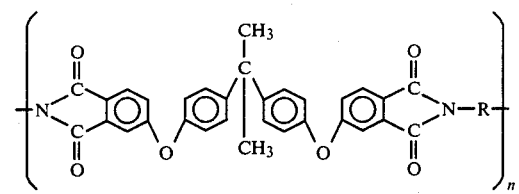

wherein R is a meta-substituted phenyl, para-substituted phenyl or 4,4'-substituted diphenyl ether group, n is between 2 to 10,000, preferably between 20 to 500, and poly(4-phenoxy-4'carbonyl)diphenyl ether represented by the following general formula of:

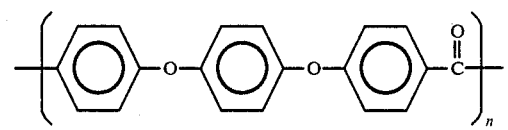

wherein n is between 2 to 10,000, preferably between 20 to 500.

The thickness of the heat radiation layer may be determined in consideration of the characteristics for reflecting the solar light, namely the solar light absorptance $\alpha s$ and the thermal emittance $\epsilon$, of the particular material used for forming the heat radiation layer. The solar light absorption and the thermal emittance are increased as the thickness of the heat radiation layer is increased. However, the performance characteristics thereof are improved as the solar light absorptance is decreased and with an increase in thermal emittance. The preferable thickness of the heat radiation layer ranges, generally, from 10 to 300 microns. On the other hand, transparency of the resin material to the solar light should be defined as a transmittance to the lights ranging within the wave lengths of 400 to 500 nm which affect the solar absorptance $\alpha s$ most seriously so as to determine the important performance characteristics of the particular FOSR. It is thus required that the transmittance at the wave length of 400 nm should be not less than 25% and that at the wave length of 450 nm should be not less than 76%, when a 75 micron thick poly(ether imide) film is used.

Figure 6:
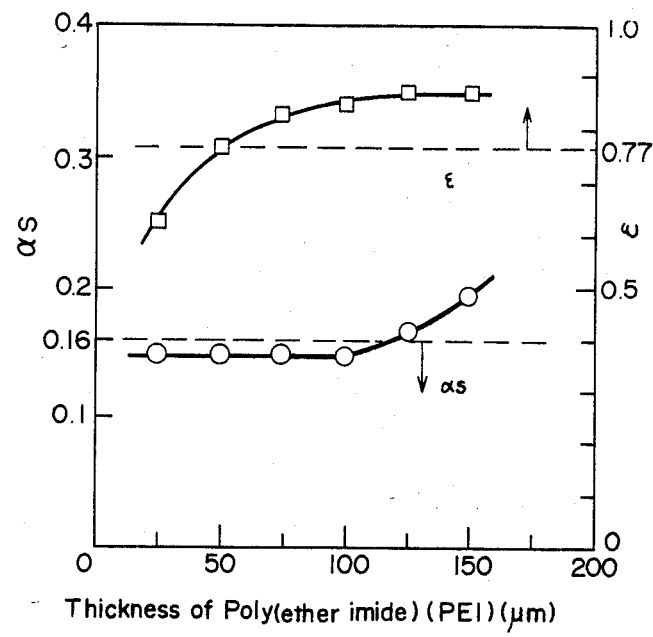
FIG. 6 is a graph showing the change in and solar absorptance ($\alpha s$) and thermal emittance ($\epsilon$) in terms of the change in heat radiation layer thickness of a silver/poly(ether imide) flexible optical solar reflector.

FIG. 6 shows the change in solar absorptance ($\alpha s$) and in thermal emittance ($\epsilon$) in terms of the change in thickness of a silverized poly(ether imide). It should be appreciated from the graph shown in FIG. 6 the pertinency of the values for $\alpha s$ being equal but not more than 0.16 and $\epsilon$ being equal but not less than 0.77 when a 75 microns thick poly(ether imide) is used.

The poly(ether imide) was synthesized by reacting 4-nitrophthalic anhydride with m-phenylene diamine, according to the process described in U.S. Pat. No. 4,024,101 referred to hereinbefore, followed by reacting with a sodium salt of 2,2-bis(4-hydroxyphenyl)propane (Bisphenol A). The process will be set forth in the serial chemical reaction equations as follows:

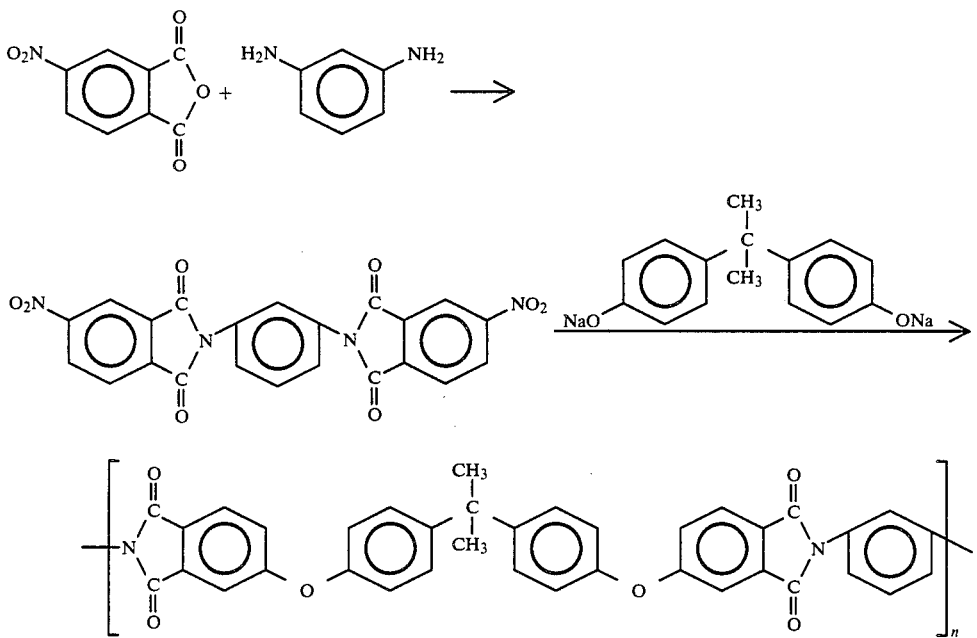

The poly(4-phenoxy-4'-carbonyl)diphenyl ether was synthesized according to the method disclosed by T. E. Attwood et al.

Figure 7:
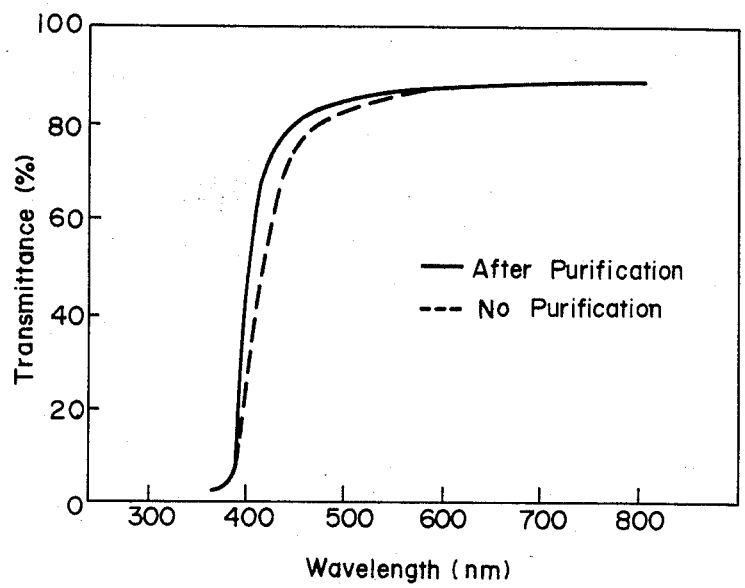
FIG. 7 is a graph showing change in UV-visible spectra prior to and after purification.

With the aim of improving the $\alpha_s$ of an aromatic poly(ether imide) film, a poly(ether imide) was refined, and the spectra prior to and after the refining step of the poly(ether imide) film were measured (see FIG. 7). 7 g to 70 g for each of a poly(ether imide) was dissolved completely in 100 ml of a methylene chloride solvent. To thus obtained solution was added 1 g of a powder form of activated carbon, and the solution was filtered under a pressure after agitating the same for a pre-set time to remove the activated carbon, whereby a poly(ether imide) solution in methylene chloride was obtained. The methylene chloride was evaporated or the solution was added to a methanol solution to precipitate the poly(ether imide) which was refined to obtain a refined poly(ether imide).

Figure 8:
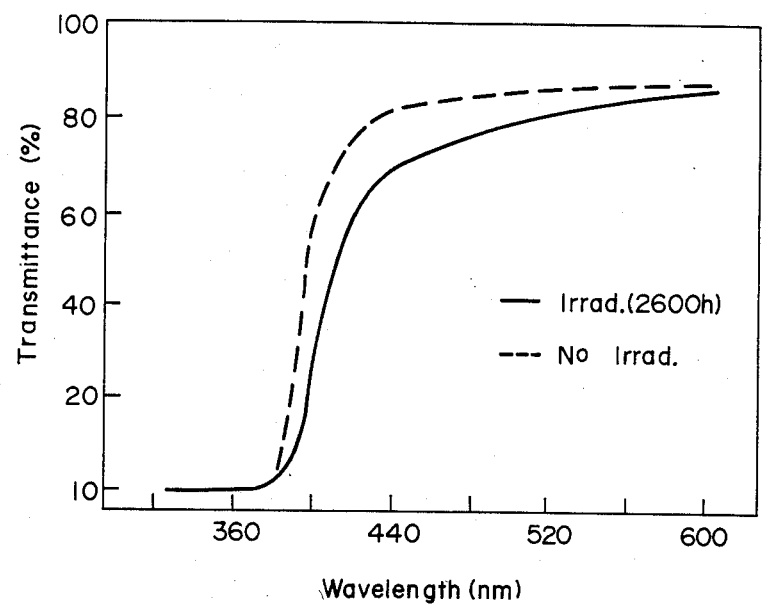
FIG. 8 is a graph showing the UV-visible spectrum changes of poly(ether imide) by UV irradiation.

FIG. 8 shows the UV-visible spectrum changes of the polyimide when irradiated by ultraviolet rays. The UV spectrum was measured at a reduced pressure of $10^{-3}$ Torr using a weathermeter (one solar) produced and sold by Suga Test Instrument Co., Ltd. The UV light source was carbon arc lamp so that a light flux of 10.3 mW/m² at a wave length of not more than 400 nm having an intensity corresponding to one equivalent sun was emitted. In the graph in FIG. 8, the real line indicates the result of a sample which had been irradiated for 2600 hours, and the dash line indicate the result of a control sample which had not been irradiated by the UV light flux.

Figure 9:
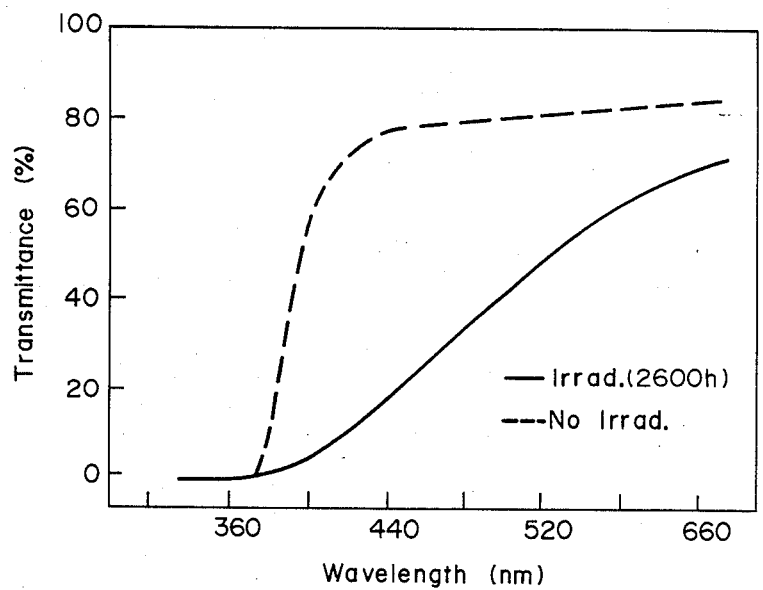
FIG. 9 is a graph showing the UV-visible spectrum changes of poly[(4-phenoxy-4'-carbonyl)diphenyl ether] by UV irradiation.
Figure 10:
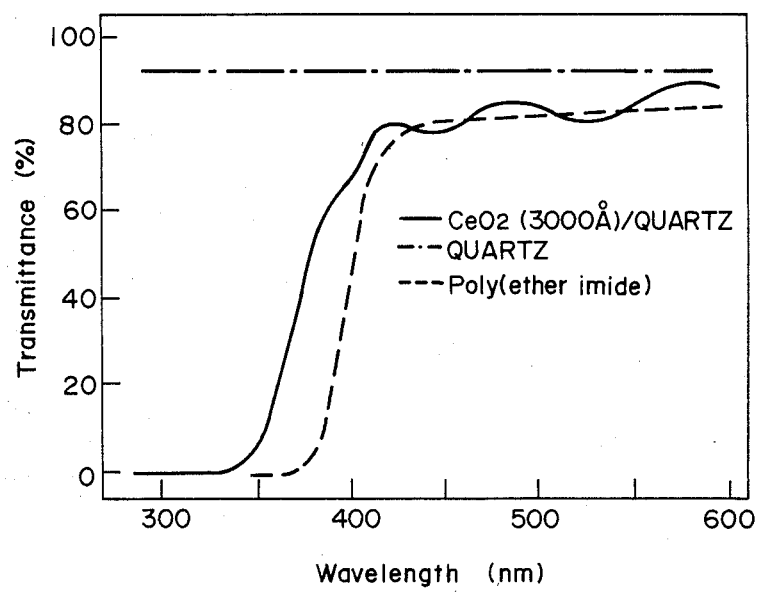
FIG. 10 is a graph showing the UV-visible spectrum of $CeO_2$/quartz system.
Figure 11:
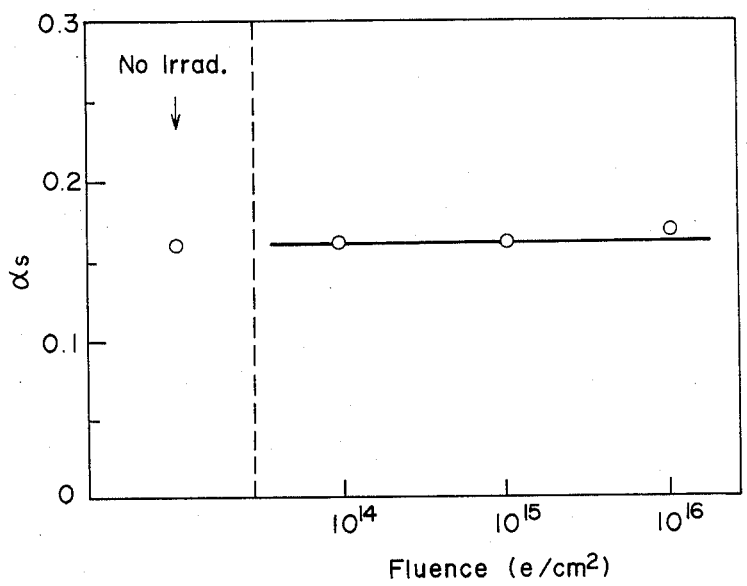
FIG. 11 is a graph showing the $\alpha s$ changes in a $CeO_2$-coated poly(ether imide) FOSR by electron irradiation.

FIG. 9 shows the UV-visible spectrum changes of poly[(4-phenoxy-4'-carbonyl)diphenyl ether] by UV ray irradiation. The results revealed that some coloring was caused by UV ray irradiation. To overcome the undesirable deterioration caused by irradiation of UV rays, a cerium dioxide layer was laid over the resin film. The results shown by the graph in FIG. 10 are the UV-visible spectrum of the samples which were a quartz, a quartz coated with 3000 Å thick cerium dioxide coating, and poly(ether imide). In FIG. 10 the dash-and-dot line indicates the result obtained by the use of quartz without any coating, the real line indicating the result of a sample coated with a 3000 Å thick cerium dioxide coating, and the dash line indicates the spectrum of the sample made of the poly(ether imide).

The cerium dioxide layer may be coated on the poly(ether imide) layer by vacuum deposition or sputtering. It is desirous that the cerium dioxide layer has a thickness of not less than 500 Å to improve the absorptance of the layer for absorbing UV rays, and preferably has a thickness of not more than 10,000 Å in order that the final product has satisfactory flexibility.

When the structure shown in FIG. 2 is used, the solar rays are incident to the cerium dioxide layer 3 where the rays within the UV range are absorbed by the cerium dioxide layer 3 and the residual rays having the wave length of 400 nm, are transmitted through the cerium dioxide layer 3 and the heat radiation layer 2 and then reflected by the solar light reflecting layer 1. As a result, deterioration of the heat radiation layer 2 is prevented since the light rays having the wave lengths of from 200 to 400 nm are absorbed by the cerium dioxide layer 3 so that the incidence thereof is inhibited.

The solar absorptance $\alpha_s$ of the solar light was measured by using a Beckmann UV5240 tester, whereas the thermal emittance $\epsilon$ was measured by using the Gier Dunkel Reflectometer Model DB100.

The electron flux source used in the test is a Cockcroft-Walter type generator which generates a flux of $1.4 \times 10^{12}$ electrons/cm² sec and an energy 300 KeV. The electron irradiation employed for the irradiation of the material is, for example, $1.0 \times 10^{16}$ e/cm² which corresponds to an electron irradiation amount irradiated in a geochynchronous orbit environment within a period approximate to 10 years.

Figure 12:
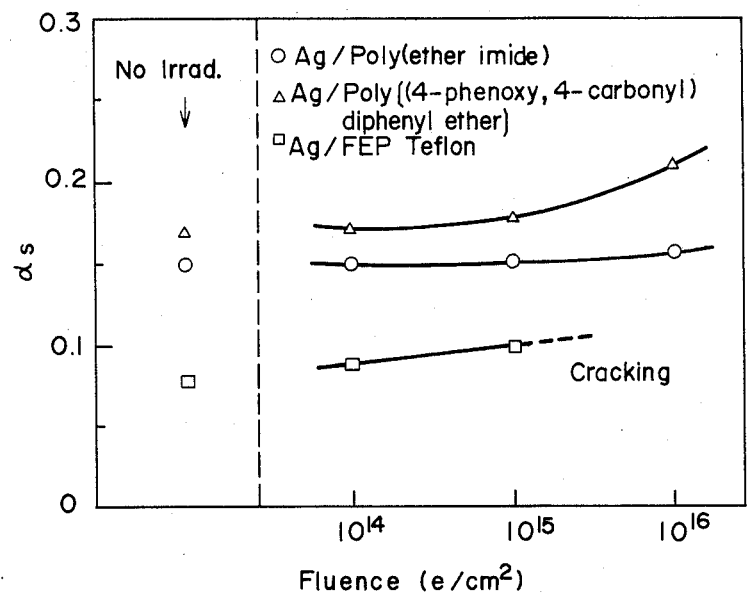
FIG. 12 is a graph showing the $\alpha s$ changes in silver/poly(ether imide), silver/poly[(4-phenoxy-4'-carbonyl)- diphenyl ether] and silver/FEP-Teflon systems by electron irradiation.

FIG. 12 shows changes in $\alpha_s$ of silver/poly(ether imide), silver/poly[(4-phenoxy-4'-carbonyl)diphenyl ether] and silver/FEP-Teflon systems by electron irradiation. The $\alpha_s$ of silver/FEP-Teflon system FOSR was increased from 0.08 to 0.10 by an electron irradiation of $10^{15}$ e/cm², and a serious deterioration occurred as the dose of electron irradiation reached $1 \times 10^{16}$ e/cm$^2$ to cause cracking and a further measurement could not be conducted.

The $\alpha_s$ of silver/poly[(4-phenoxy-4'-carbonyl)-diphenyl ether] system FOSR was increased from 0.17 to 0.21. In comparison with that result, it be appreciated that the change in $\alpha_s$ of the silver/poly(ether imide) with the increase in electron irradiation amount or dose is relatively smaller.

FIG. 13 shows the $\alpha_s$ changes in silver/poly(ether imide) and silver/poly(ether imide)/CeO$_2$ system flexible solar reflectors induced by UV irradiation. The $\alpha_s$ of the silver/poly(etherimide) is increased slightly as will be seen from the graph. However, the $\alpha_s$ of the silver/poly(ether imide)/CeO$_2$ system FOSR is not sufficient to show a deteriorating effect caused by the UV irradiation.

FIGS. 14 and 15 show the effects of electron irradiation on mechanical properties, i.e. the elongation and the tensile strength, of poly(ether imide), poly[(4-phenoxy-4'-carbonyl)disphenyl ether] and FEP-Teflon system. The mechanical properties were measured while using an Instron tensile tester under the following conditions:

Elongation Rate: 20 mm/min;
Specimen Used: ASTM D1822 Type L Dumbell.

The FEP-Teflon system suffered deterioration and cracking at a dose of $1 \times 10^{16}$ e/cm$^2$, the elongation at that time being 0% and the tensile strength at that time being 0 kg/cm$^2$. On the other hand, the poly(ether imide) and Poly[(4-phenoxy-4'-carbonyl)diphenyl ether] system optical solar reflectors, according to the invention, maintained substantially constant mechanical properties.

The $\alpha_s$ value of the silver/poly(ether imide) system (Thickness of the Film: 100 microns) was decreased from 0.17 to 0.15 after being subjected to purification step.

The FOSR of the invention may be applied with an electrically conductive layer made of indium oxide or indium-tin oxide. The structure shown in FIG. 3 includes a transparent conductive layer 4 laminated on the poly ether imide layer 2 for allowing the electrical charge generated by electron irradiation to be leaked. The structure shown in FIG. 4 further includes a transparent conductive layer 4 laminated on the protection layer 3, the protection layer 3 being laid over the poly(ether imide) layer 2 for the prevention of deterioration by electron irradiation. It is generally known that polymers are charged with electricity when irradiated with a radioactive ray having a low energy, and the thus charged electricity might cause dielectric breakdown to deteriorate the properties of the polymers at the time of discharging. FIG. 16 shows the results of the tests wherein a poly(ether imide) flexible optical solar reflector covered with an indium-tin oxide layer was irradiated by electron irradiation. The thickness of the indium-tin oxide layer is determined so that it has a surface resistivity not to cause discharge of charged electricity and is satisfactorily transparent. The preferred surface resistivity is about 1 KΩ/square centimeter, the thickness corresponding to the preferred surface resistivity being about 100 Å.

A multilayer thermal insulator is used to suppress the change in temperature within an artificial satellite in an aerospace environment when the instruments contained in the satellite are small in number and generate only little exothermic heat. As shown in FIG. 5 showing the structure thereof, a plurality of optical solar reflector elements or layers 5 are laminated with a plurality of thermal insulator elements or layers 6, the number of respective layers being determined in consideration of the intended use. The outermost optical solar reflector has an exterior surface exposed to the aerospace environment, and thus the reflective characteristics of the outermost optical solar reflector and the radiation characteristics of the absorbed solar light affect the thermal insulation effect to a considerable degree. Poly(ether imide)s or poly[(4-phenoxy-4'-carbonyl)diphenyl ether] are used to form the heat radiating resin layer of the outermost optical solar reflector. The material for the insulating element or layer 6 may be, for example, a copolymer of tetrafluoroethylene and hexafluoroethylene.

An electrically conductive layer may be applied over the outermost layer in order that deterioration or degradation of the outermost FOSR of the multilayer thermal insulator by the charge or discharge of charged particles in the aerospace environment is prevented.

The poly(ether imide) and poly[(4-phenoxy-4'-carbonyl)-diphenyl ether], according to the present invention, may be used as a material for the heat radiation layer of the FOSR. This is due to the fact that the optical and mechanical properties of the silver/poly(ether imide) system are maintained stably during the irradiation by electron beam. Increase in $\alpha_s$ of the silver/poly(ether imide) and silver/poly(ether ether ketone) systems by UV ray irradiation may be suppressed by coating a cerium dioxide layer, which serves as a layer for preventing deterioration by UV rays, over the silver/poly(ether imide) and silver/poly(ether ether ketone) layer. Poly(ether imide) films may be used for forming solar cell protection coatings, because they are inexpensive and light in weight. Furthermore, the multilayer thermal insulator of the invention is superior in insulation effect when used in an artificial satellite or the like, since the solar absorptance thereof under radioactive ray irradiation is small.

EXAMPLE 1

Preparation of Poly(ether imide)

(1) Synthesis of bis(nitrophthalimide):

A mixture of 50 parts of m-cresol and 30 parts of toluene was added with 40 parts of 4-nitrophthalic anhydride and 11.19 parts of m-phenylenediamine. The mixture was heated and refluxed at 120° to 125° C. for 80 minutes under agitation in a nitrogen gas flow atmosphere. Then, the mixture was allowed to stand for cooling to room temperature to form a yellow product which was separated by filtration, rinsed with acetone and methanol, and then dried in vacuum at 100° C. The yield was 93%.

(2) Synthesis of Poly(ether imide)

A sodium methoxide solution prepared from 1 part of sodium and 100 parts of absolute methanol was added with 4.96 parts of 2,2-bis(4-hyroxyphenyl)propane in a nitrogen atmosphere to dissolve the latter. After stirring the solution for 10 minutes, it was subjected to evaporation to be dried and then subjected to drying in vacuum at 100° C. and at 1 Torr. 5.94 parts of the thus prepared sodium salt of 2,2-bis(4-hydroxyphenyl)propane was added with 10 parts of bis(nitrophthalimide) together with 50 parts of dried methyl formamide. The admixture was then agitated at 60° C. for 3 hours in a nitrogen atmosphere. 15 parts of the aforementioned admixture was added dropwisely into 500 parts of methanol to form precipitate which was dissolved in chloroform to obtain a solution. The solution was added to methanol for re-precipitation, and the resultant precipitate was dried.

The intrinsic viscosity of the product precipitate in dimethyl formamide at 25° C. was 0.50 dl/g. The result of ultimate analysis was as follows:

Found: C, 74.7%; H, 4,0%; N, 4,7%

The calculated composition as $C_{37}H_{24}N_2O_6$ was follows:

Calcd.: C, 75.0%; H, 4.1%; N, 4,7%

Maximum absorption peaks in the infrared absorption spectrum were found at wave lengths of 720, 1720 and 1780 cm$^{-1}$. In view of the preparation process and the analytical results, it was confirmed that the resultant product had the following structural formula:

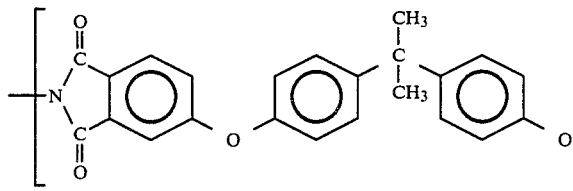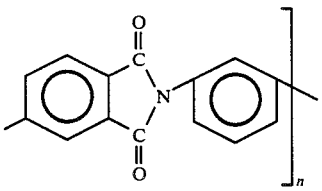

wherein n is between 2 to 10,000, preferably between 20 to 500.

The product represented by the preceding structural formula will be referred to simply as poly(ether imide) in the following description.

Generally following to the procedure as described above, except in that p-phenylenediamine was used in place of m-phenylenediamine to prepared the compound represented by the structural formula:

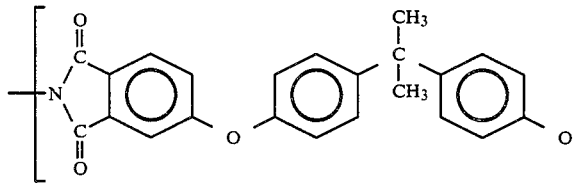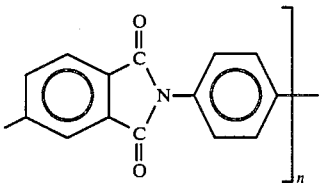

wherein n is between 2 to 10,000, preferably between 20 to 500.

Generally following to the procedure as described above, except in that 4,4'-diaminodiphenyl ether was used in place of m-phenylenediamine to prepare the compound represented by the structural formula:

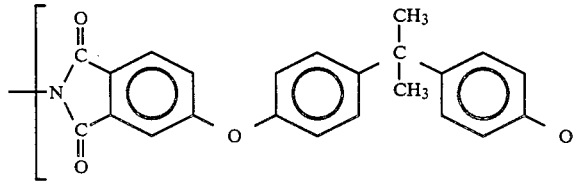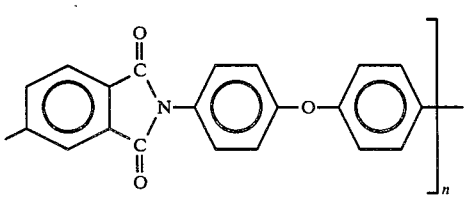

wherein n is between 2 to 10,000, preferably between 20 to 500.

Purification of Poly(ether imide)

7 to 70 g of the poly(ether imide) was dissolved completely in 100 ml of methylene chloride, and added with 1 g of an activated carbon powder was added, followed by agitation at room temperature. Then, the activated carbon powder was removed by filtration under pressure to obtain a solution of poly(ether imide) in methylene chloride. The poly(ether imide) was precipitated either by evaporating the methylene chloride solvent while allowing the solute to stand in the room or the solution was poured into methanol, whereby purified poly(ether imide) was obtained.

Preparation of Poly(ether imide) Film 7.5 g of the purified poly(ether imide) was dissolved in 100 ml of methylene chloride, followed by agitation at room temperature, to be dissolved in methylene chloride completely. The purified poly(ether imide) solution in methylene chloride was poured over a glass plate and spread by a film applicator to have a pre-set thickness, followed by drying at room temperature for an hour, and then dried at 100° C. for additional 2 hours to prepare a film. The thus prepared purified poly(ether imide) film having a thickness of 50 microns was covered with a 2000 Å thick silver layer by sputtering. A 1000 Å thick Ni-Cr alloy layer was applied by spattering on the reverse side, reverse to the side over which the silver was applied to form a protection layer. The $\alpha$s of the thus prepared FOSR was 0.15 and the $\epsilon$ thereof was 0.77, and the $\alpha$s and $\epsilon$ thereof after being subjected to electron irradiation of $10^{16}$ e/cm$^2$ using an electron beam of 300 KeV, the irradiation amount corresponding to the irradiation of radioactive rays incident for about 10 years, were 0.16 and 0.77, respectively.

EXAMPLE 2

Synthesis of Poly[(4-phenoxy-4'-carbonyl)diphenyl Ether]

In accordance with the method by T. E. Attwood et al., bis-4-fluorophenyl ketone was mixed with potassium salt of hydroquinone in a diphenylsulfone solvent, and heated to 220° to 240° C. while covering the reaction mixture with nitrogen gas. Then, the pressure in the reactor was reduced to about 30 mmHg to evaporate the solvent and unreacted materials, whereby a slurry of bis-phenoxide was obtained. Thereafter, a slightly excess amount of bis-fluorophenyl ketone was added, and the mixture was heated at 335° C. for 2 to 3 hours, followed by separation of the polymer. The viscosity of the polymer can be determined by the Ostwald viscometer at 25° C. while using 98% sulfuric acid as the solvent. The thus obtained polymer had a Tm of 335° C. and was represented by the structural formula:

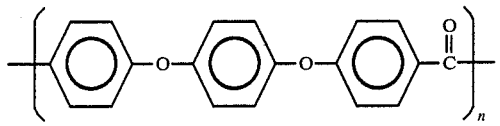

wherein n is between 2 to 10,000, prefarably between 20 to 500.

A film was prepared by compression molding. A 100 micron thick poly[(4-phenoxy-4'-carbonyl)diphenyl ether] was coated with silver by ion-plating method to form a silver layer having a thickness of 2000 Å. The applied by sputtering to form a transparent conductive layer.

In other embodiments, the materials for the heat radiation layer was the same poly[(4-phenoxy-4'-carbonyl)-diphenyl ether] synthesized in the preceding Example 2 of the invention in the form of a 100 micron thick film. Silver was deposited to form a 2000 Å thick layer for reflecting solar light, and an Ni-Cr alloy was deposited over the reverse side to form a 1000 Å thick protection layer. The results are shown in Table 1.

EXAMPLE 4

The same poly(ether imide) film as synthesized in Example 1 was used to form a heat radiation layer having a thickness of 50 microns. A silver layer for reflecting solar light was applied on the poly(ether imide) film by vacuum deposition to form a silver haat radiation layer of 2000 Å in thickness. A 1000 Å thick cerium dioxide layer was deposited on the poly(ether imide) layer by the heating electron beam deposition method to form a layer for the prevention of deterioration by UV rays. A 100 Å thick transparent conductive layer was formed over the poly(ether imide) film or over the cerium dioxide layer by depositing an indium-tin oxide. For the comparison purpose, an FOSR control was prepared by depositing silver on a tetrafluoroethylene/

TABLE 1

| Material for Flexible Optical Solor Reflector | Thickness of CeO₂ Layer (Å) | Thickness of In—Sn Oxide Layer (Å) | αs | ε |
|---|---|---|---|---|
| Ni—Cr/Ag/Poly (ether imide) (50 μm) | 1500 | — | 0.19 | 0.77 |
|  | 3000 | — | 0.17 | 0.80 |
|  | 4500 | — | 0.17 | 0.79 |
| Ni—Cr/Ag/Poly (ether imide) (50 μm) | 1500 | 100 | 0.19 | 0.76 |
|  | 3000 | 100 | 0.18 | 0.79 |
| Ni—Cr/Ag/Poly (ether imide) (50 μm) | 4500 | 100 | 0.18 | 0.77 |
| Ni—Cr/Ag/Poly (ether imide) (100 μm) | 1500 | — | 0.26 | 0.85 |
|  | 3000 | — | 0.24 | 0.85 |
|  | 4500 | — | 0.25 | 0.85 |
| Ni—Cr/Ag/Poly (ether imide) (100 μm) | 1500 | 100 | 0.26 | 0.83 |
|  | 3000 | 100 | 0.25 | 0.83 |
|  | 4500 | 100 | 0.25 | 0.83 |
| Ni—Cr/Ag/Poly (ether imide) (50 μm) | — | — | 0.15 | 0.77 |
| Ni—Cr/Ag/Poly[(4-phenoxy-4-carbonyl)-Diphenyl Ether] (100 μm) | — | — | 0.17 | 0.82 | initial αs and ε values of the thus prepared FOSR was 0.17 and 0.82, respectively; and those after being subjected to electron irradiation of $10^{16}$ e/cm² using an electron beam of 300 KeV, the irradiation amount corresponding to the irradiation of radioactive rays incident for about 10 years when the FOSR had been held along a stationary orbit, were 0.21 and 0.82, respectively.

EXAMPLE 3

The same poly(ether imide) film as synthesized in Example 1 was used to form a heat radiation layer having a thickness of 50 to 100 microns. A silver layer for reflecting solar light was applied on the poly(ether imide) film by vacuum deposition to form a silver heat radiation layer of 2000 Å in thickness. A 1000 Å thick nickel-chromium alloy layer was deposited on the side reverse to the silver layer to form a protection layer. The surface of the opposed side of the poly(ether imide) film was coated with a cerium dioxide layer having a thickness of 1500 Å to 4500 Å by vacuum deposition. Furthermore, a 100 Å thick indium-tin oxide layer was The thus prepared control FOSR was also subjected to tests to determine the αs and ε thereof. The samples were irradiated by 300 KeV, $10^{16}$ e/cm² electron beam, the electron beam irradiation corresponding to the amount of radioactive ray irradiation incident during 10 year period when the samples were held in a stationary geosynchronous orbit environment. The initial values of αs and ε and those after the irradiation are shown in the following Table 2. The Ni-Cr/Ag/Poly(ether imide)/CeO₂ was irradiated by UV ray for 2600 hrs, which amount corresponds to the amount of UV ray irradiation incident during 1 year-period if the Ni-Cr/Ag/Poly(ether imide)/CeO₂ was held in a stationary geosynchronous orbit environment. The αs and ε values were hardly changed by the irradiation.

TABLE 2

| Material for FOSR | Initial Value | | After Irradiation of Electron Beam | |
|---|---|---|---|---|
|  | αs | ε | αs | ε |
| Ni—Cr/Ag/Poly(ether imide)/CeO₂ | 0.16 | 0.79 | 0.17 | 0.79 |
| Ni—Cr/Ag/Poly(ether imide/ | 0.16 | 0.80 | 0.17 | 0.80 |

TABLE 2-continued

| Material for FOSR | Initial Value | | After Irradiation of Electron Beam | |
|---|---|---|---|---|
| | αs | ε | αs | ε |
| In—Sn Oxide Ni—Cr/Ag/Poly(ether imide)/ CeO$_2$/In—Sn Oxide | 0.16 | 0.80 | 0.17 | 0.80 |
| Ag/copolymer of Tetrafluoroethylene and Hexafluoropropylene | 0.08 | 0.80 | Unmeasurable Due to Detrioration | |

EXAMPLE 5

The same poly(ether imide) film as synthesized in Example 1 was used to form a 50 micron thick outermost FOSR film of a multilayer thermal insulator system. A 2000 Å thick silver layer was deposited by ion plating method to form an optical solar reflecting layer. For comparison purposes, another polyimide film was coated with an aluminium layer. The solar light absorption (αs) and thermal emittance (ε) of each of the samples were measured.

After irradiating the samples with an electron beam of 30 KeV, $10^{16}$ e/cm$^2$, the electron beam irradiation corresponding to the amount of radioactive ray irradiation incident during 10 year period if the samples were held in a stationary geosynchronous orbit environment, values of αs and ε of each of the samples were measured. The results are shown in Table 3.

TABLE 3

| Material for FOSR | Initial Value | | After Irradiation of Electron Beam | |
|---|---|---|---|---|
| | αs | ε | αs | ε |
| Ag/Poly(ether imide) (50 μm) | 0.15 | 0.77 | 0.16 | 0.77 |
| Al/Polyimide | 0.50 | 0.86 | 0.50 | 0.86 |

After the invention has been described by referring to presently preferred embodiments thereof, it should be noted hereby that all of the embodiments are illustrated by example only and it is not intended to limit the invention only to such particular embodiments. The invention is, thus, defined by the appended claims.

What is claimed is:

1. A flexible optical solar reflector comprising:
   a heat radiation resin layer having a thickness of from 10 to 300 microns, said resin being selected from the group consisting of poly((4'-phenoxy-4-carbonyl)diphenylether) represented by the following general formula

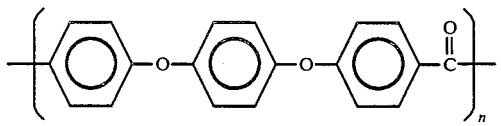

wherein n is between 2 to 10,000;
and poly(ether imide) represented by the following general formula

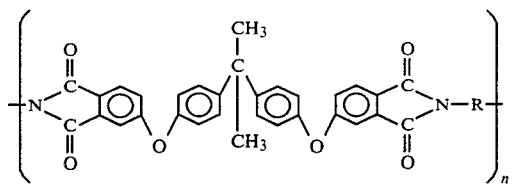

wherein R is a meta-substituted phenyl group, a para-substituted phenyl group or a 4,4'-substituted phenyl ether group, n is between 2 to 10,000, a solar light reflecting layer on one side of said heat radiation layer comprising a thin coating of a metal selected from the group consisting of silver, aluminium, and silver-aluminium alloy and said solar light reflecting layer having a thickness of from 500 to 9000 Å; and a protection layer on the side of said heat radiation layer opposite to said solar light reflecting layer comprising cerium dioxide for screening out UV and for preventing degradation or deterioration of said heat radiation layer by UV rays, and said protection layer having a thickness of from 500 to 10000 Å.

2. The flexible optical solar reflector according to claim 1, further comprising an additional layer covering said protection layer of cerium dioxide and having a thickness of 100 to 300 Å, said additional layer comprising an oxide selected from the group consisting of indium oxide and indium-tin oxide.

3. The flexible optical solar reflector according to claim 1, wherein said n of said poly((4'-phenoxy-4-carbonyl)diphenyl ether) is between 20 to 500, and said n of said poly(ether imide) is between 20 to 500.

4. The flexible optical solar reflector according to claim 1, wherein said resin comprising said heat radiation layer has characteristics such that a layer 75 microns thick has (i) a light transmittance of not less than 25% at a wave length of 400 nm (ii) a light transmittance of not less than 76% at a wave length of 450 nm, (iii) a thermal emittance of not less than 0.77 and (iv) a solar absorptance of not more than 0.16.

5. The flexible optical solar reflector according to claim 4, wherein said n of said poly((4'-phenoxy-4-carbonyl)diphenyl ether) is between 20 to 500, and said n of said poly(ether imide) is between 20 to 500.

6. The flexible optical solar reflector according to claim 5, wherein said resin comprising said heat radiation layer is said poly((4'-phenoxy-4-carbonyl)diphenyl ether).

7. The flexible optical reflector according to claim 5, wherein said resin comprising said heat radiation layer is said poly(ether imide).

8. In a multilayer thermal insulator comprising at least one optical solar reflecting layer alternating with at least one thermal insulating layer to form a laminate and having one of said at least one optical reflecting layer as the outermost layer which is exposed to solar light, said at least one optical solar reflector layer comprising a heat radiation layer of a resin and a solar light reflecting layer on said heat radiation layer,
   the improvement comprising
   said outermost optical solar reflector comprising
   (i) a heat radiation layer of a resin selected from the group consisting of poly((4-phenoxy-4'-carbonyl)-diphenyl ether) represented by the formula

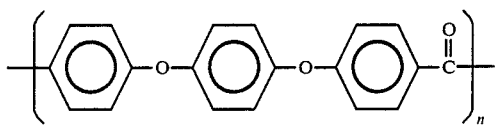

wherein n is between 2 to 10,000
and poly(ether imide)s represented by the formula

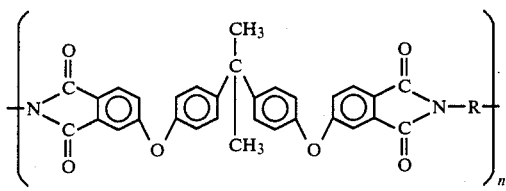

wherein R is a meta-substituted phenyl group, a para-substituted phenyl group or a 4,4'-substituted phenyl ether group, n is between 2 to 10,000, and
(ii) a solar light reflecting layer on one side of said heat radiation layer which comprises a thin coating of a metal selected from the group consisting of silver, aluminium, and silver-aluminium alloy which is positioned adjacent a thermal insulator layer; and
a cerium dioxide layer coated on the side of said heat radiation layer of said resin opposite to said solar light reflecting layer to provide protection against degradation by UV rays.

9. The flexible optical solar reflector according to claim 8, wherein said n of said poly(4'-phenoxy-4-carbonyl)diphenyl ether is between 20 to 500, and said n of said poly(ether imide) is between 20 to 500.

10. The multilayer thermal insulator according to claim 8, wherein said heat radiation resin layer of said outermost optical solar reflector having a thickness of 75 microns has a light transmittance of not less than 25% at a wave length of 400 nm and a light transmittance of not less than 76% at a wave length of 450 nm, and wherein said heat radiation layer of said resin having a thickness of 75 microns has a theremal emittance of not less than 0.77 and a solar absorptance of not more than 0.16.

11. The multilayer thermal insulator according to claim 8, wherein said solar light reflecting layer has a thickness of from 500 to 9,000 Å.

12. The multilayer thermal insulator according to claim 8, wherein said cerium dioxide has a thickness of from 500 to 10,000 Å.

13. The multilayer thermal insulator according to claim 8, further comprising an additional layer covering said protection layer of cerium dioxide and having a thickness of 100 to 300 Å, said additional layer being made of an oxide selected from the group consisting of indium oxide and indium-tin oxide.

14. The multilayer thermal insulator according to claim 8, wherein said thermal insulator layer is made of a copolymer of tetrafluoroethylene and hexafluoropopylene.

15. The flexible optical solar reflector according to claim 8, wherein
said heat radiation layer of said resin has a thickness of from 10 to 300 microns;
said resin comprising said heat radiation layer has characteristics such that a layer 75 microns thick has (i) a light transmittance of not less than 25% at a wave length of 400 nm, (ii) a light transmittance of not less than 76% at a wave length of 450 nm, (iii) a thermal emittance of not less than 0.77 and (iv) a solar absorptance of not more than 0.16;
said solar light reflecting layer has a thickness of from 500 to 9000 Å.; and
said n of said poly((4'-phenoxy-4-carbonyl)diphenyl ether) is between 20 to 500, and said n of said poly(ether imide) is between 20 to 500.

16. The flexible optical solar reflector according to claim 15, wherein said resin comprising said heat radiation layer is said poly((4'-phenoxy-4-carbonyl)diphenyl ether).

17. The flexible optical solar reflector according to claim 15, wherein said resin comprising said heat radiation layer is said poly(ether imide).

* * * * *